(12) United States Patent
Kim et al.

(10) Patent No.: US 11,943,524 B2
(45) Date of Patent: Mar. 26, 2024

(54) CAMERA MODULE WITH MOVABLE FILTER

(71) Applicant: SAMSUNG ELECTRO-MECHANICS CO., LTD., Suwon-si (KR)

(72) Inventors: Jong Ki Kim, Suwon-si (KR); Won Kyu Jang, Suwon-si (KR); Hee Sung Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 64 days.

(21) Appl. No.: 17/722,590

(22) Filed: Apr. 18, 2022

(65) Prior Publication Data

US 2022/0407992 A1 Dec. 22, 2022

(30) Foreign Application Priority Data

Jun. 22, 2021 (KR) .................. 10-2021-0080996

(51) Int. Cl.
| | |
|---|---|
| H04N 23/55 | (2023.01) |
| G02B 5/30 | (2006.01) |
| G02B 7/00 | (2021.01) |
| G02B 7/02 | (2021.01) |
| G02B 27/28 | (2006.01) |

(Continued)

(52) U.S. Cl.
CPC .............. H04N 23/55 (2023.01); G02B 5/30 (2013.01); G02B 7/006 (2013.01); G02B 7/021 (2013.01); G02B 27/28 (2013.01); H04N 23/51 (2023.01); H04N 23/54 (2023.01); H04N 23/57 (2023.01); *G03B 11/00* (2013.01)

(58) Field of Classification Search
CPC ........ H04N 23/55; H04N 23/51; H04N 23/54; H04N 23/57; G02B 5/20; G02B 5/30–3075; G02B 7/021; G02B 7/006; G02B 27/28–288; G03B 7/00; G03B 11/00; G03B 2207/00
See application file for complete search history.

(56) References Cited

U.S. PATENT DOCUMENTS 6,028,303 A * 2/2000 Suzuki .................. G03B 11/00
  359/488.01
6,281,805 B1  8/2001 Lee
  (Continued)

FOREIGN PATENT DOCUMENTS

JP      11-160779 A    6/1999
JP     2001-100285 A    4/2001
  (Continued)

OTHER PUBLICATIONS

Korean Office Action dated Jul. 20, 2022, in counterpart Korean Patent Application No. 10-2021-0080996 (7 pages in English and 5 pages in Korean).

*Primary Examiner* — Twyler L Haskins
*Assistant Examiner* — Akshay Trehan
(74) *Attorney, Agent, or Firm* — NSIP Law

(57) ABSTRACT

A camera module is provided. The camera module includes a lens module including one or more lenses; an image sensor configured to convert light passing through the lens module into an electrical signal; and a filter configured to perform a polarization function, wherein the filter is configured to be movable in a space formed between the lens module and the image sensor.

17 Claims, 8 Drawing Sheets

(51) Int. Cl.
G03B 11/00 (2021.01)
H04N 23/51 (2023.01)
H04N 23/54 (2023.01)
H04N 23/57 (2023.01)

(56) References Cited

U.S. PATENT DOCUMENTS

| | | | |
|---|---|---|---|
| 8,508,646 B2* | 8/2013 | Katerberg | H04N 23/951 |
| | | | 359/437 |
| 10,228,571 B2* | 3/2019 | Wada | G03B 17/14 |
| 2010/0157082 A1* | 6/2010 | Katerberg | G03B 17/14 |
| | | | 348/222.1 |
| 2015/0042818 A1* | 2/2015 | Wada | G02B 27/281 |
| | | | 348/164 |

FOREIGN PATENT DOCUMENTS

| | | | | | |
|---|---|---|---|---|---|
| JP | 2001100285 A | * | 4/2001 | | G02B 7/08 |
| JP | 2012-513607 A | | 6/2012 | | |
| JP | 2018-60087 A | | 4/2018 | | |
| JP | 2018060087 A | * | 4/2018 | | G02B 7/04 |
| KR | 10-2001-0054117 A | | 7/2001 | | |
| KR | 10-2015-0097090 A | | 8/2015 | | |
| KR | 10-2018-0112989 A | | 10/2018 | | |
| WO | WO 2010/074719 A1 | | 7/2010 | | |

* cited by examiner

CAMERA MODULE WITH MOVABLE FILTER

CROSS-REFERENCE TO RELATED APPLICATIONS

This application claims the benefit under 35 USC § 119(a) of Korean Patent Application No. 10-2021-0080996, filed on Jun. 22, 2021, in the Korean Intellectual Property Office, the entire disclosure of which is incorporated herein by reference for all purposes.

BACKGROUND

1. Field

The following description relates to a camera module.

2. Description of Related Art

A camera module may include an optical system including one or more lenses and an image sensor, and may capture an image of a subject.

The camera module may be combined with various types of devices such as, but not limited to, a personal computer (PC) and a portable terminal. Specifically, camera modules have recently been gradually implemented in vehicles in order to provide various functions such as, but not limited to, autonomous driving, the prevention of driving lane departure, or the provision of vehicle around view.

In an example in which the camera module is implemented in vehicles, the camera module may be exposed to various environmental elements when the vehicle is in motion. A typical camera module may have a problem wherein it may be difficult to obtain high-quality image information in bad weather (heavy rain, heavy snow, fog, or the like) as an external environment.

In an example, in bad weather that causes hydroplaning, freezing, or the like, light may be incident on the camera module from an external subject in a diffusely reflected state, thereby resulting in a glare or a blur phenomenon, and as a result, there may be a problem that the quality of image information may deteriorate.

Additionally, the typical camera module may have a problem in that it may be difficult to actively respond to a sudden change in an external environment (e.g., a change in weather).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a lens module including one or more lenses; an image sensor configured to convert light passing through the lens module into an electrical signal; and a filter configured to perform a polarization operation, wherein the filter is configured to be movable in a space formed between the lens module and the image sensor.

The camera module may include a filter actuator configured to provide a driving force to move the filter, wherein the filter may be configured to be moved linearly in a direction that intersects an optical axis by the filter actuator, to be positioned in a location that is distant from image sensor.

The filter actuator may be configured to rotate a polarization axis of the filter when the filter moves.

The filter actuator may include a tray configured to movably support the filter; a lead screw rotatably connected to the tray; and a driving motor configured to rotate the lead screw, wherein the tray may be configured to move in the direction that intersects the optical axis with the lead screw.

A rotation axis of the driving motor may be perpendicular to a moving direction of the tray.

The filter actuator may further include a guide device configured to guide the movement of the tray, the tray may include a first connector disposed on a first side of the tray; and a second connector disposed on a second side of the tray, the first connector may be in contact with the lead screw, and the second connector may be slidably connected to the guide device.

The guide device may be disposed in parallel with the lead screw.

The second connector may have a length that is greater than a length of the first connector.

The tray may include a movement tray configured to move in the direction that intersects the optical axis; and a rotation tray disposed to be rotatable with respect to the movement tray, wherein the filter may be coupled to the rotation tray to rotate with the rotation tray.

The filter actuator may further include a guide device connected to the tray, and wherein the guide device may include a guide shaft, connected to the movement tray, and configured to guide the movement of the movement tray; and a rotation guide, connected to the rotation tray, and configured to rotate the rotation tray when the movement tray moves.

The rotation tray may be configured to have a friction portion on an outer circumferential surface thereof in contact with the rotation guide, and the rotation tray may be rotated by a rolling friction between the friction portion and the rotation guide when the movement tray moves.

In a general aspect, a camera module includes a lens module comprising one or more lenses; an image sensor configured to receive light passing through the lens module; and a filter configured to polarize the light passing through the lens module, wherein the filter is configured to be movable between a first position facing the image sensor, and a second position, distant from the image sensor.

The camera module may further include a housing having an internal space in which the lens module, the image sensor, and the filter are accommodated, wherein the first position and the second position are formed in the internal space of the housing.

The filter may be configured to move linearly between the first position and the second position.

A polarization axis may be rotated when the filter moves between the first position and the second position, and a rotation angle of the polarization axis may increase in proportion to a moving distance of the filter.

The movement of the filter and the rotation of the polarization axis may be performed by a single driving motor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
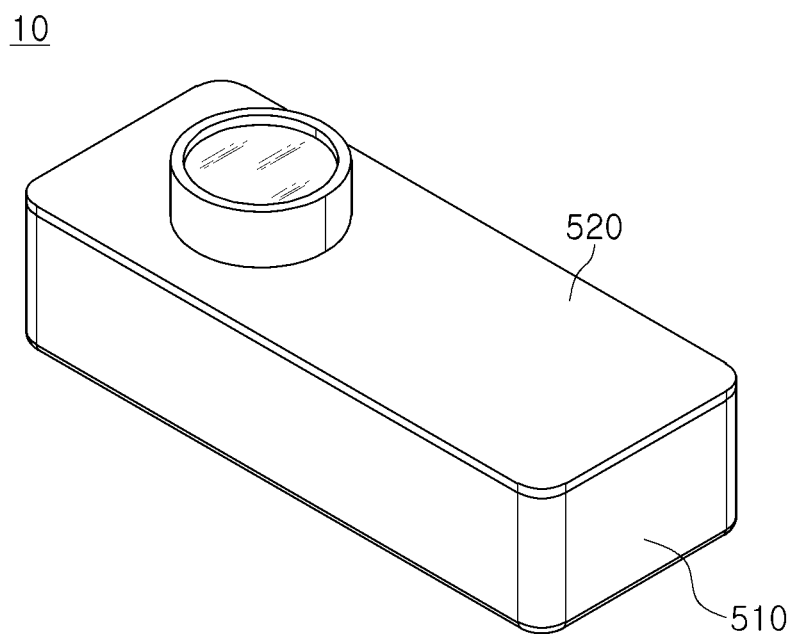
FIG. 1 illustrates a perspective view of an example camera module, in accordance with one or more embodiments.

Hereinafter, exemplary embodiments of the present disclosure will now be described in detail with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

One or more examples may provide a camera module that blocks reflected light, and obtains a high-quality image by applying a filter and a filter actuator to perform a polarization function.

Figure 2:
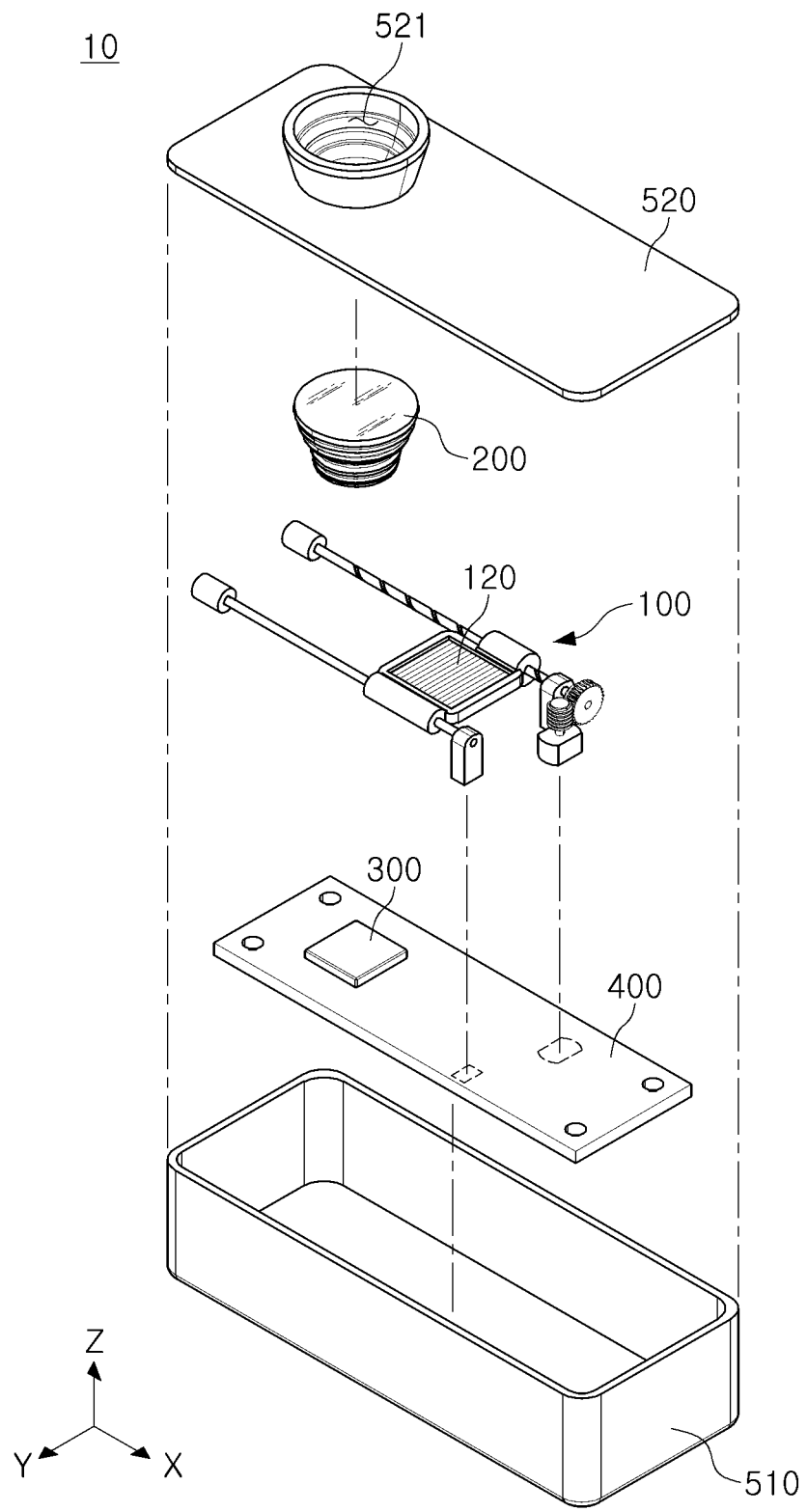
FIG. 2 illustrates an exploded perspective view of an example camera module, in accordance with one or more embodiments.

FIG. 1 is a perspective view of an example camera module 10, in accordance with one or more embodiments, and FIG. 2 is an exploded perspective view of the example camera module 10, in accordance with one or more embodiments.

Referring to FIGS. 1 and 2, the example camera module 10 may include a housing 510 having an internal space, a lens module 200 including one or more lenses, an image sensor 300 provided in the internal space of the housing 510 and configured to receive light passing through the lens module 200, a filter 120 that polarizes the light passing through the lens module 200, a filter actuator 100 that moves the filter 120, a circuit board 400 electrically connected to the image sensor 300, and a cover 520 that covers the upper side of the housing 510.

The housing 510 may be combined with the cover 520 to constitute an appearance of the camera module 10. The housing 510 may have an internal space to accommodate the lens module 200, the image sensor 300, the filter 120, the filter actuator 100, the circuit board 400, etc.

In one or more examples, a plurality of housings 510 may be provided and coupled to each other. In an example, a first housing (not shown) that accommodates the lens module 200 may be provided independently from a second housing (not shown) that accommodates the image sensor 300, and the first housing (not shown) and the second housing (not shown) may be coupled to each other to constitute an overall appearance of the camera module 10. That is, the housing 510 illustrated in FIG. 1 is merely an example, and in one or more examples, the lens module 200 and the image sensor 300 or the filter actuator 100 may be accommodated in separate housings, respectively.

In an example, the cover 520 may cover the upper side of the housing 510 to separate the internal space of the housing 510 from the outside of the camera module 10. An incident hole 521 may be formed in at least a portion of the cover 520, and light incident through the incident hole 521 may be incident on the lens module 200.

In one or more examples, the lens module 200 may include one or more lenses that image a subject. When a plurality of lenses is arranged, the plurality of lenses may be mounted inside the lens module 200, and may be aligned in an optical axis direction (e.g., Z-axis direction). The lens module 200 may include one or more cylindrical lens barrels each having a hollow shape.

In one or more examples, the camera module 10 may include a lens driver (not shown) that moves the lens module 200. The lens driver (not shown) may move the lens module 200 in a direction of an optical axis (Z-axis) to perform a focusing function or a zoom function, or may move the lens module 200 in a direction perpendicular to the optical axis (Z-axis) (e.g., X-axis or Y-axis) to perform an optical image stabilization function. Alternatively, the lens driver (not shown) may rotate the lens module 200 about the optical axis (Z-axis), or rotate about an axis (e.g., X-axis or Y-axis) perpendicular to the optical axis (Z-axis) to perform an optical image stabilization function. That is, the lens driver (not shown) may include a focusing device that performs a focusing operation and an optical image stabilization device or optical image stabilizer that performs optical image stabilization.

The image sensor 300 may convert light incident through the lens module 200 into an electrical signal. In an example, the image sensor 300 may include a charge coupled device (CCD) or a complementary metal-oxide semiconductor (CMOS), as only examples. The image sensor 300 may be electrically connected to the circuit board 400, and accordingly, the electrical signal converted by the image sensor 300 may be output to the outside through the circuit board 400.

In one or more examples, the image sensor 300 may be aligned with the lens module 200 in the optical axis direction (Z-axis direction) on the circuit board 400. The image sensor 300 may receive light incident in the optical axis direction (Z-axis direction) through the lens module 200, and convert the incident light into an electrical signal.

The example camera module 10 may include a sensor driver (not shown) that moves the image sensor 300. The sensor driver (not shown) may move the image sensor 300 in the optical axis direction (Z-axis direction) or in a direction (e.g., X-axis or Y-axis direction) intersecting, or perpendicular to, the optical axis to perform a focusing operation or an optical image stabilization operation. In an example, the sensor driver may perform an optical image stabilization operation by moving the image sensor 300 on a plane (X-Y plane) perpendicular to the optical axis. Alternatively, the sensor driver may perform an optical image stabilization operation by rotating the image sensor 300 about the optical axis (Z-axis), or rotating the image sensor 300 about an axis (X-axis or Y-axis) perpendicular to the optical axis (Z-axis).

The camera module 10, in accordance with one or more examples, may move the filter 120 in the internal space of the housing 510.

In one or more examples, the filter 120 may include a polarization filter that polarizes light passing through the lens module 200. That is, in one or more examples, the filter 120 may allow the passage of only light vibrating in a specific direction coincident with a polarization axis with respect to the incident light. The filter 120 may include a filter of various types as well as the polarization filter. In an example, the filter 120 may include an infrared filter that blocks light having a wavelength in an infrared region with respect to the light incident through the lens module 200.

The filter 120, in accordance with one or more examples, may be movably provided in the internal space of the housing 510, and in an example, may be provided to be movable in a space formed between the lens module 200 and the image sensor 300.

A driving force to move the filter 120 may be provided by the filter actuator 100. In one or more examples, the filter actuator 100 may be provided in the internal space of the housing 510 to move the filter 120 to be positioned between the lens module 200 and the image sensor 300 or to be positioned at another location. In an example, the filter actuator 100 may linearly move the filter 120 in a direction (e.g., X-axis direction) intersecting the optical axis (Z-axis) to be positioned above the image sensor 300 or not to be positioned above the image sensor 300. When the filter 120 is positioned above the image sensor 300, the incident light passing through the lens module 200 may be polarized, and the polarized light may be incident on the image sensor 300. On the other hand, when the filter 120 is not positioned above the image sensor 300, incident light may be incident on the image sensor 300 in a non-polarized state. However, a moving direction of the filter 120 is not limited to what has been described above, and the filter 120 may move in the internal space of the housing 510 in various directions. That is, in one or more examples, the camera module 10 may appropriately move the filter 120, so that polarized or non-polarized light is incident on the image sensor 300.

The example camera module 10 may obtain a clear image by blocking a flare or unnecessary reflected light with respect to the incident light through the filter 120 to perform a polarization operation. In an example, when the example camera module 10 is implemented as a camera for a vehicle, it is possible to obtain a clear image of an obstacle or a lane positioned around the vehicle by blocking reflected light having an indiscriminate phase.

Hereinafter, a filter 120 and a filter actuator 100, in accordance with one or more examples, will be described in detail with reference to FIGS. 3 and 4.

Figure 3:
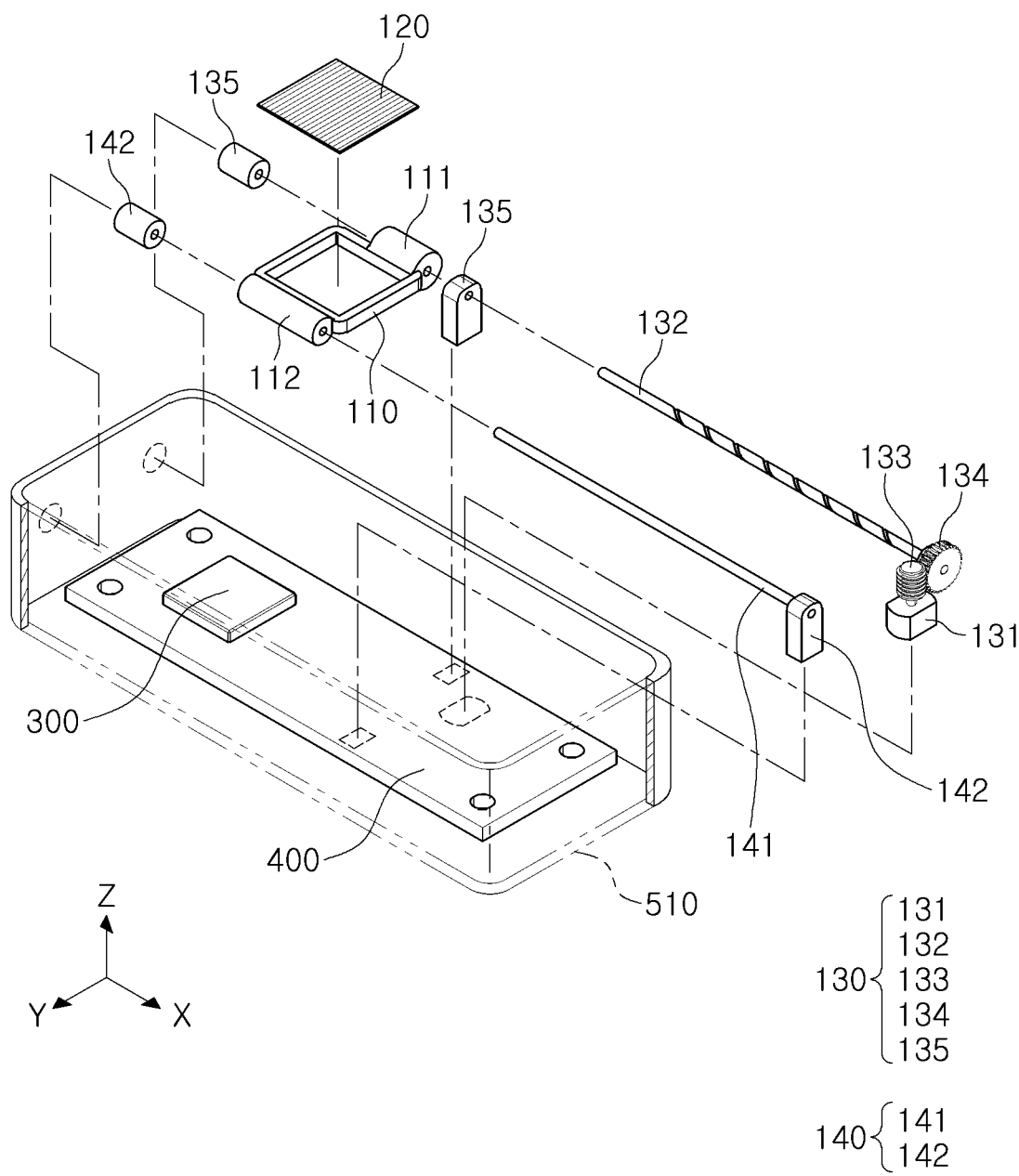
FIG. 3 illustrates an exploded perspective view of an example filter actuator, in accordance with one or more embodiments.
Figure 4A:
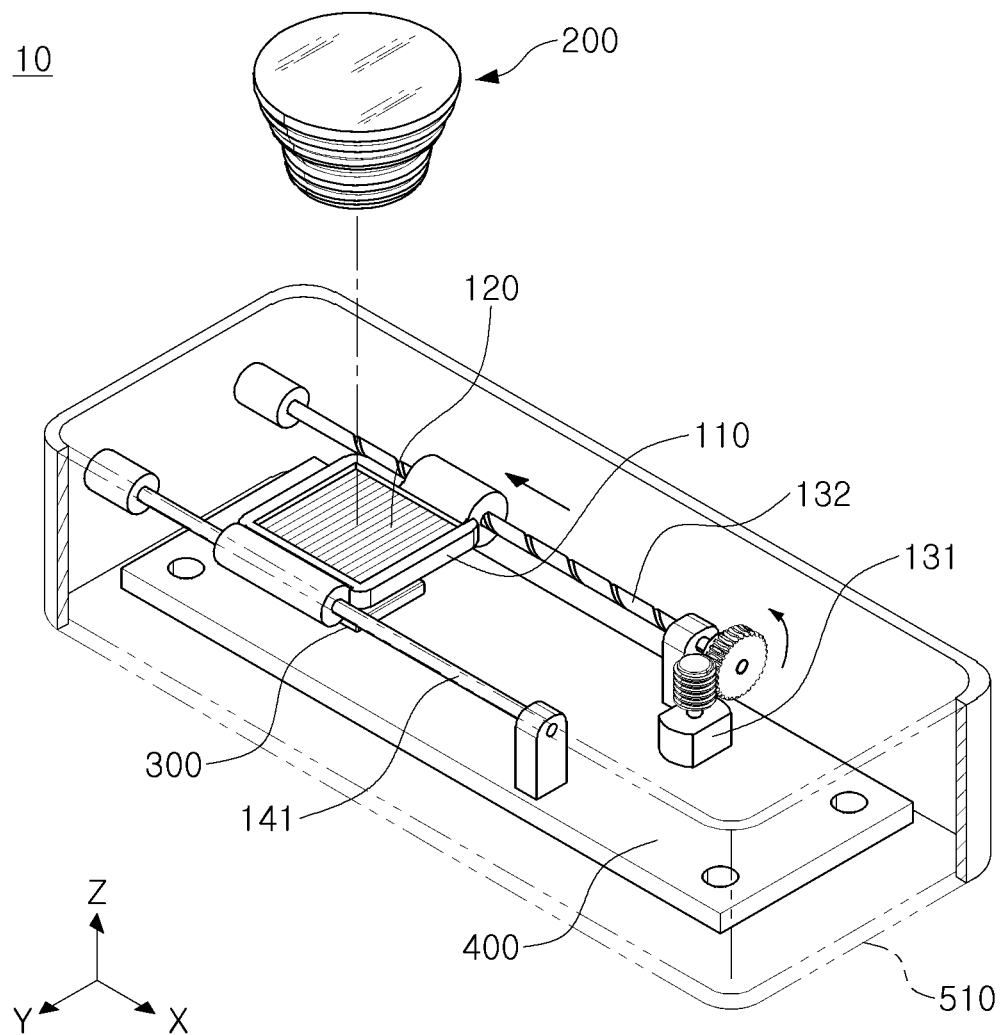
FIGS. 4A and 4B illustrate views of examples illustrating the driving of an example filter actuator, in accordance with one or more embodiments.
Figure 4B:
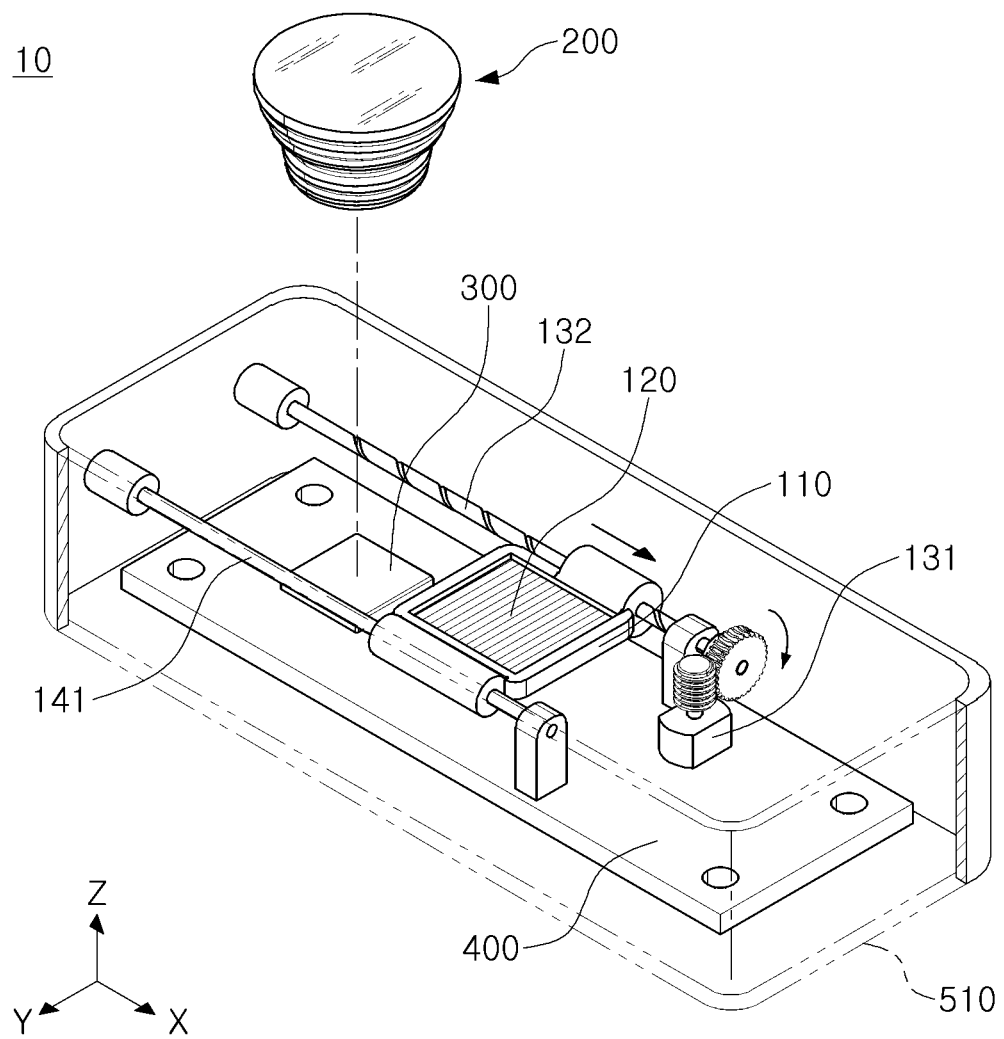

FIG. 3 illustrates an exploded perspective view of a filter actuator 100, in accordance with one or more embodiments, and FIGS. 4A and 4B are views of examples illustrating the driving of the filter actuator 100 to be described with reference to FIG. 3. Since a camera module 10, a filter 120, and a filter actuator 100 to be described with reference to FIGS. 3, 4A, and 4B include the features of the camera module 10, the filter 120, and the filter actuator 100 described above with reference to FIGS. 1 and 2, an overlapping description thereof will not be repeated.

The filter actuator 100, in accordance with one or more embodiments, may be provided in an internal space of a housing 510 to move the filter 120 which polarizes incident light.

The filter actuator 100, in accordance with one or more embodiments, may include a filter 120, a tray 110 that accommodates and supports the filter 120, a driving device or driver 130 that moves the tray 110, and a guide device 140 that guides the movement of the tray 110. The driver 130 may generate a driving force to move the tray 110, and may include, for example, a driving motor 131 and a lead screw 132 as illustrated in FIG. 3.

In the camera module in accordance with one or more embodiments, the filter 120 may be disposed to be movable with respect to the lens module 200 or the image sensor 300 in a space formed between the lens module 200 and the image sensor 300. In an example, the filter 120 may move in the internal space of the housing 510 to cover or not to cover an upper side of the image sensor 300. That is, the filter 120 may be inserted into, or removed from, the space between the lens module 200 and the image sensor 300.

In one or more examples, the filter 120 may reciprocate between any two locations in the internal space of the housing 510. In an example, the filter 120 may be provided to be movable between a first position facing the image sensor 300 and a second position disposed away from the image sensor 300. The filter 120 may be disposed to face the image sensor 300 at the first position, and thus, incident light passing through the lens module 200 may be incident on the image sensor 300 after passing through the filter 120. The filter 120 may be disposed away from the space between the image sensor 300 and the lens module 200 at the second position, and thus, incident light passing through the lens module 200 may be incident on the image sensor 300 without passing through the filter 120.

In an example, FIG. 4A illustrates an example state in which the filter 120 is disposed in the first position between the lens module 200 and the image sensor 300, and FIG. 4B illustrates an example state in which the filter 120 is disposed in the second position away from the space between the lens module 200 and the image sensor 300. In one or more examples, the filter actuator 100 may be provided to linearly move the filter 120 in a direction intersecting the optical axis (Z-axis) between the first position and the second position. Accordingly, as illustrated in FIGS. 4A and 4B, the filter 120 may reciprocate in a space or an area formed between the lens module 200 and the image sensor 300 to be inserted into, or removed from, the space between the lens module 200 and the image sensor 300.

In one or more examples, both the first position and the second position of the filter 120 may be formed in the internal space of the housing 510. That is, the filter 120 may be provided to move only in the internal space of the housing 510. Accordingly, the filter 120 may be protected from an external environment of the housing 510 or the camera module, and penetration of foreign substances from the outside of the housing 510 can be prevented while the filter 120 is inserted or removed.

In one or more examples, the filter 120 may move between the lens module 200 and the image sensor 300 in a direction (e.g., X-axis direction) intersecting the optical axis. The filter 120 may be provided in parallel with the image sensor 300, and thus may be disposed to face the image sensor 300 at a predetermined distance by moving in a direction (X-axis direction) intersecting the optical axis.

In one or more examples, the filter 120 may have a width equal to or greater than a light receiving portion of the image sensor 300. Accordingly, when the filter 120 covers the upper side of the image sensor 300, incident light passing through the lens module 200 may be incident on the image sensor 300 after entirely passing through the filter 120. However, the filter 120 may not necessarily have a greater width than the light receiving portion of the image sensor 300. In an example in which the filter 120 is positioned between the lens module 200 and the image sensor 300, it is beneficial that the filter 120 be wide enough to allow incident light to pass therethrough.

The filter 120 may include a polarization filter that allows passage of light vibrating or travelling in a direction coincident with a polarization axis. Therefore, in one or more examples, the the camera module may selectively perform a polarization function as necessary by positioning the filter 120 between the lens module 200 and the image sensor 300 when it is necessary to polarize incident light, and removing the filter 120 from the space between the lens module 200 and the image sensor 300 when it is not necessary to polarize incident light.

In one or more examples, the filter 120 may be accommodated in the tray 110, and may be implemented to be movable in the internal space of the housing 510. The tray 110 may surround and support the filter 120, which is relatively thin and light, so that the filter 120 is moved precisely and stably inside the housing 510. In an example, as illustrated in FIG. 3, the tray 110 may be provided in the shape of a plate having a through hole in the optical axis direction (Z-axis direction), and the filter 120 may be accommodated in the through hole of the tray 110. Accordingly, the filter 120 and the tray 110 may move together inside the housing 510. However, the configuration of the tray 110 is not limited to what has been described above. In an example, the tray 110 may be integrally formed with the filter 120.

The tray 110 may include connectors 111 and 112 connected to the driver 130 that generates a driving force to move the filter 120 or the guide device 140 o guide the movement of the filter 120. In an example, as illustrated in FIG. 3, the tray 110 may include a first connector 111 connected to the driver 130, and a second connector 112 connected to the guide device 140. In one or more examples, the first connector 111 and the second connector 112 may be provided on different sides of the tray 110, respectively. In an example, the first connector 111 may be provided at a first side edge of the tray 110, and the second connector 112 may be provided at a second side edge of the tray 110 opposite to the first side edge of the tray 110.

In one or more examples, the first connector 111 and the second connector 112 may have different sizes. In an example, a length of the second connector 112 connected to the guide device 140 may be greater than a length of the first connector 111 to sufficiently secure an area contacting the guide device 140. Alternatively, the first connector 111 connected to the driving device 130 may be shorter and thicker than the second connector 112 to reduce friction and receive driving force well. However, the specific shapes of the first connector 111 and the second connector 112 are not limited to what has been described above, and the first connector 111 and the second connector 112 may be provided in various shapes and lengths.

The example filter actuator 100 may include a driving device 130 that moves the tray 110 in which the filter 120 is accommodated. The driving device 130 may generate a driving force to move the filter 120. In an example, as illustrated in FIG. 3, the driving device 130 may include a driving motor 131 that generates a rotational driving force, and a lead screw 132 connected to the driving motor 131 to transmit the driving force. Hereinafter, the example driving device 130 of the filter actuator 100 will be described on the premise that it includes a driving motor 131 and a lead screw 132. However, the configuration of the driving device 130 is not limited thereto, and in other some embodiments, the driving device 130 may include a coil and a magnet to move the filter 120 based on an electromagnetic force.

The driving device 130, in accordance with one or more examples, may move the filter 120 based on a rotational driving force of the driving motor 131. The driving motor 131 may be fixedly provided with respect to the housing 510. In an example, as illustrated in FIG. 3, the driving motor 131 may be fixedly provided on an upper side of the circuit board 400.

The driving motor 131 may be electrically connected to the circuit board 400 to receive electrical energy from an external or internal power source of the camera module (10 in FIG. 1 or 2), so that the driving motor 131 may be driven. A screw-shaped worm 133 may be further provided on a driving shaft of the driving motor 131, and the driving motor 131 may be connected to the lead screw 132 through the worm 133. Accordingly, a rotation axis of the driving shaft of the driving motor 131 and a rotation axis of the lead screw 132 may be perpendicular to each other. Additionally, a high rotation speed of the driving motor 131 may be appropriately reduced through an operation of the worm 133, and an appropriate driving force of the driving motor 131 may be transmitted to the lead screw 132.

The lead screw 132 may be supported by a plurality of support members 135, and may be rotatably provided inside the housing 510. The lead screw 132 may rotate by receiving a rotational driving force from the driving motor 131. According to the rotation of the lead screw 132, the tray 110 and the filter 120 connected thereto may move the lead screw 132 in a direction intersecting the optical axis (Z-axis) direction.

In one or more examples, the lead screw 132 may extend in a direction (e.g., an X-axis direction) perpendicular to the optical axis, and may be provided to be rotatable about a rotation axis passing through the center of the lead screw. In a non-limited example, the lead screw 132 may be a screw-type shaft with a thread formed on an outer circumferential surface thereof. The lead screw 132 may be provided to penetrate through the first connector 111 of the tray 110. In this example, the first connector 111 of the tray 110 may include a nut corresponding to the thread of the lead screw 132 in a portion through which the lead screw 132 penetrates, so that the first connector 111 of the tray 110 is screw-coupled to the lead screw 132. Accordingly, as illustrated in FIG. 4B, according to the rotation of the lead screw 132, the tray 110 may move linearly in a rotation axis direction of the lead screw 132. However, the configuration of the connection between the lead screw 132 and the tray 110 is not limited to what has been described above. In an example, a thread may be formed in the first connector 111 of the tray 110, and a nut corresponding to the thread of the first connector 111 may be provided on the lead screw 132. In an example, a lubricating fluid may be applied to the portion where the lead screw 132 and the first connector 111 contact each other to reduce friction.

A worm wheel 134 may be provided at one end of the lead screw 132 to be screw-coupled to the worm 133 of the driving motor 131. That is, the driving motor 131 and the lead screw 132 may be connected to each other through a worm gear device (that is, the worm 133 and the worm wheel 134), and the lead screw 132 may rotate about an axis intersecting the rotation axis of the driving motor 131 as the driving motor 131 rotates. The other end of the lead screw 132 may be rotatably coupled to an inner surface of the housing 510 via the support member 135.

In one or more examples, the filter actuator 100 may include a guide device 140 that guides the movement of the tray 110. The guide device 140 may include a guide shaft 141 extending in a direction of an axis (the X-axis direction) perpendicular to the optical axis, and the tray 110 may move in the direction perpendicular to the optical axis (the Z-axis direction) along the guide shaft 141. In an example, as illustrated in FIG. 3, the guide shaft 141 may be provided in the shape of a bar extending in a direction (e.g., the X-axis direction) perpendicular to the optical axis (the Z-axis direction). A first end and a second end of the guide shaft 141 may be fixed to the housing 510 via respective support members 142, and at least a portion between a first end and a second end of the guide shaft 141 may penetrate through the second connector 112 of the tray 110. Accordingly, the tray 110 may slidably move along an extension direction of the guide shaft 141. In one or more examples, the guide shaft 141 and the lead screw 132 may extend in a direction to be parallel with each other. Thus, since the tray 110 may be connected to both the guide shaft 141 and the lead screw 132, which are provided in parallel with each other, the linear movement of the tray 110 may be stable.

In one or more examples, a friction reducing member, (not shown) that reduces friction between the guide shaft 141 and the second connector 112, may be further provided. In a non-limited example, the friction reducing member (not shown) may include a bearing or a bush. Alternatively, a lubricating fluid may be applied between the guide shaft 141 and the second connector 112 to reduce friction.

In one or more examples, a filter actuator 100 may rotate a polarization axis of a filter 120 to polarize incident light in a more effective manner. Hereinafter, a filter actuator 100 that rotates a polarization axis will be described with reference to FIGS. 5 through 7.

Figure 5:
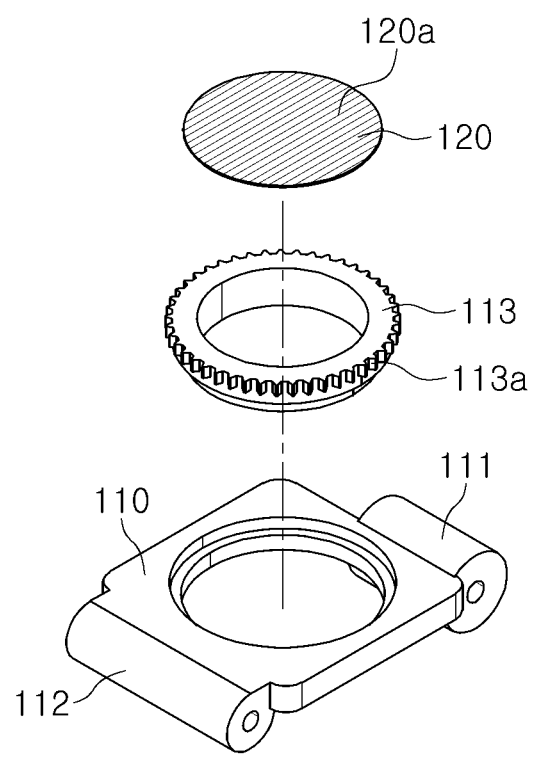
FIG. 5 illustrates an exploded perspective view of an example tray, in accordance with one or more embodiments.
Figure 6:
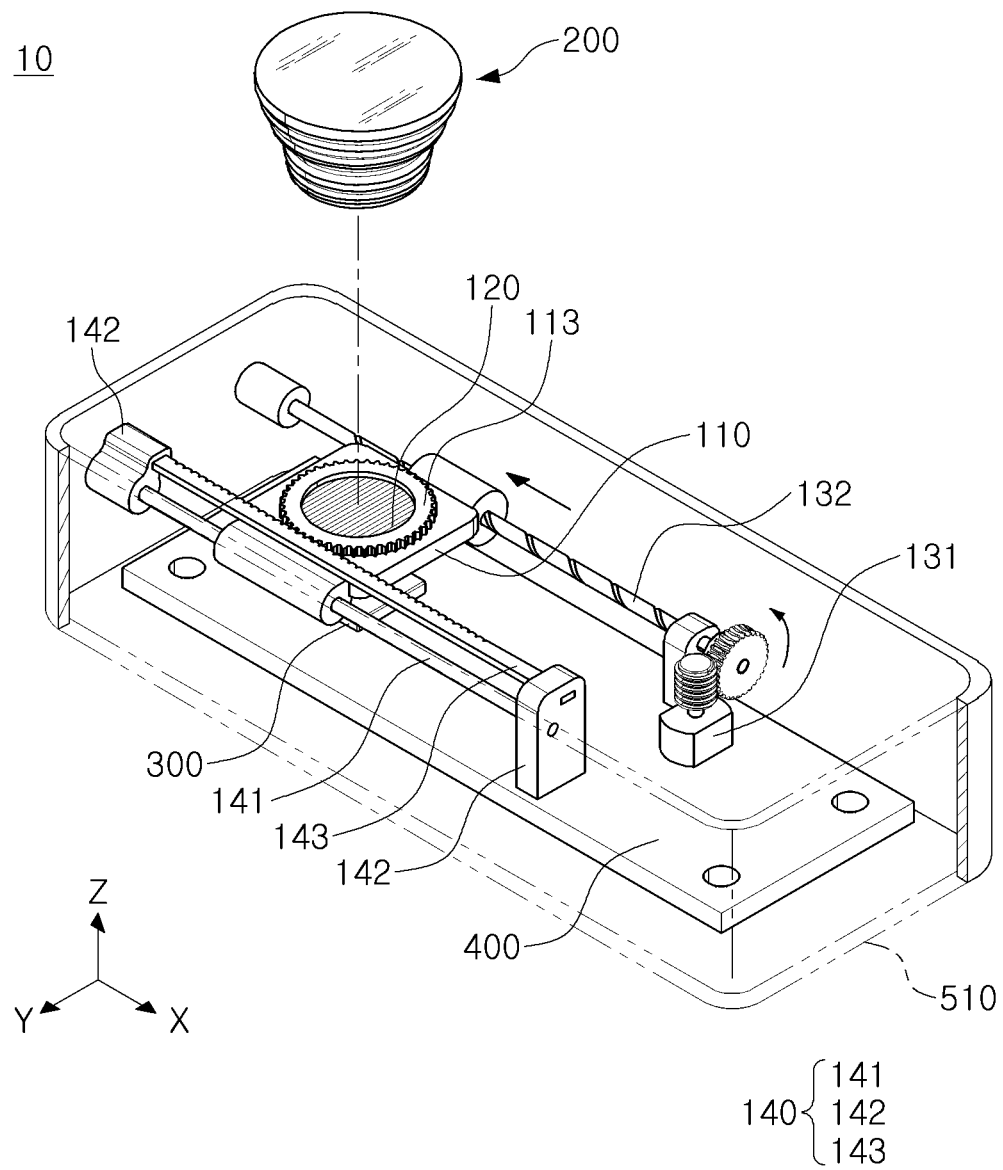
FIG. 6 illustrates a perspective view of an example filter actuator including an example tray, in accordance with one or more embodiments.
Figure 7A:
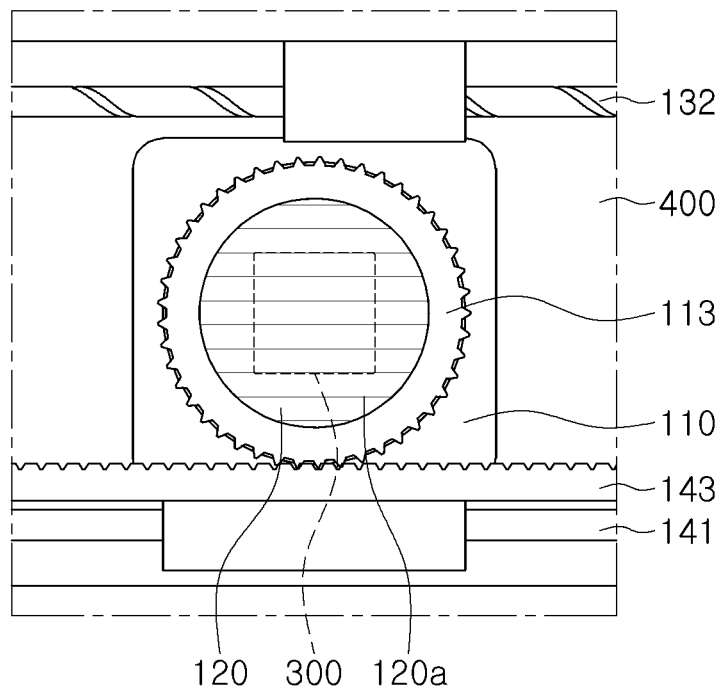
FIGS. 7A and 7B illustrate views of examples illustrating the driving of an example filter actuator, in accordance with one or more embodiments.
Figure 7B:
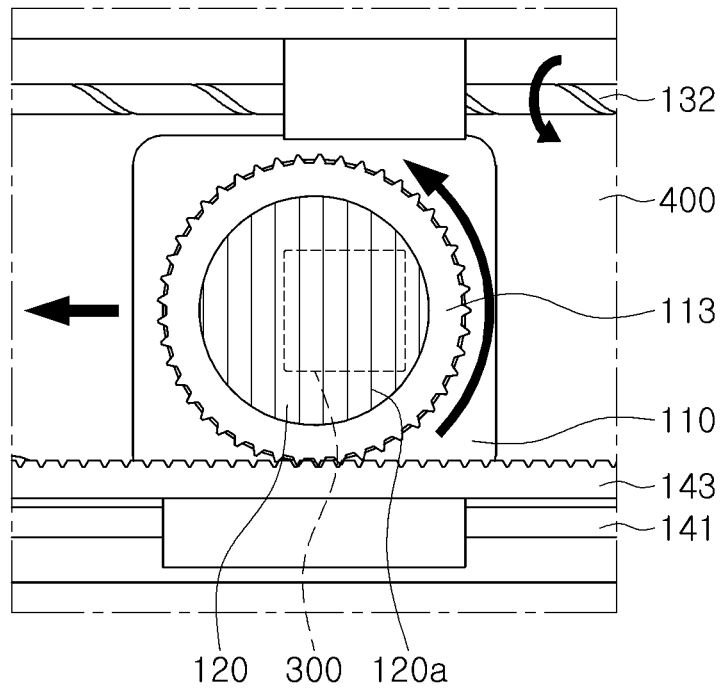

FIG. 5 is an exploded perspective view of an example tray 110 according, in accordance with one or more embodiments, and FIG. 6 is a perspective view of an example filter actuator 100 including the example tray, in accordance with one or more embodiments. FIGS. 7A and 7B are views of examples illustrating the driving of the example filter actuator 100, in accordance with one or more embodiments. The filter actuator 100 to be described below with reference to FIGS. 5 through 7 may include all the components of the example filter actuator 100 described above with reference to FIGS. 1 through 4, with a tray and a guide 143 to rotate a polarization axis 120a of a filter 120 being added thereto, and thus, the description based on FIGS. 5 through 7 overlapping with that based on FIGS. 1 through 4 will not be repeated.

The tray included in the filter actuator 100, in accordance with one or more embodiments, may further include a rotation tray 113 that is rotatably provided. In an example, as illustrated in FIG. 5, the tray may include a movement tray 110 provided to be movable in the internal space of the housing (510 in FIG. 6), and a rotation tray 113 provided to be rotatable with respect to the movement tray 110. In an example, the movement tray 110 may include all the features of the tray 110 described above with reference to FIGS. 3 and 4, while the rotation tray 113 is provided therewith. Thus, for the position at which the movement tray 110 is provided, or the connection structure between the movement tray 110 and the other components, etc., the description of the tray 110 of FIGS. 3 and 4 may be referred to. In an example, the lead screw 132 may be connected to the first connector 111 of the movement tray 110 to transmit a driving force, and the guide shaft 141 may be connected to the second connector 112 of the movement tray 110 to guide the movement of the movement tray 110.

In one or more examples, the rotation tray 113 may be rotatably coupled to the movement tray 110. That is, as the movement tray 110 moves, the rotation tray 113 may move together in the same direction as the movement tray 110, and at the same time, rotate with respect to the movement tray 110. The rotation tray 113 may have a hollow section or area, and the filter 120 may be inserted into the hollow area of the rotation tray 113 to rotate together with the rotation tray 113 with respect to the movement tray 110.

In one or more examples, the rotation tray 113 may be rotated by a driving force to move the movement tray 110. That is, the rotation tray 113 may be provided to rotate with respect to the movement tray 110 as the movement tray 110 moves. Accordingly, the guide device 140, in accordance with one or more embodiments, may further include a rotation guide 143. The rotation guide 143 may be connected to the rotation tray 113, and may rotate the rotation tray 113 according to the movement of the movement tray 110. That is, the guide device 140, in accordance with one or more embodiments, may include a guide shaft 141 connected to the movement tray 110 and a rotation guide 143 connected to the rotation tray 113. In an example, as illustrated in FIG. 6, the guide device 140 may include a guide shaft 141 and a rotation guide 143 spaced apart from each other and extending in parallel with each other. The guide shaft 141 and the rotation guide 143 may be fixed to the housing by the same support member 142.

In one or more examples, the rotation tray 113 may have a friction portion 113a on an outer circumferential surface thereof, and the rotation guide 143 may be provided in contact with the friction portion 113a of the rotation tray 113. As the movement tray 110 is moved by the driving motor 131, a rolling frictional force may be generated between the friction portion 113a of the rotation tray 113 and the rotation guide 143, and the rotation tray 113 may be rotated with respect to the movement tray 110 by the rolling frictional force. Therefore, both movement and rotation of the filter 120 can be implemented through a single driving motor (e.g., 131 in FIG. 6).

In one or more examples, while the movement tray 110 moves between a first position (e.g., a position of the tray 110 in FIG. 4A) and a second position (e.g., a position of the tray 110 in FIG. 4B), the rotation tray 113 may also rotate continuously accordingly. Since the rolling friction force may be continuously generated between the rotation tray 113 and the rotation guide 143 while the movement tray 110 is moving, a moving distance of the movement tray 110 and an amount of rotation of the rotation tray 113 may be positively proportional to each other. That is, in one or more examples, a rotation angle of the polarization axis 120a of the filter 120 may increase in proportion to the moving distance of the filter 120.

Each of FIGS. 7A and 7B illustrates a state in which the filter 120 rotates as the movement tray 110 and the rotation tray 113 move. As illustrated in FIGS. 7A and 7B, when the movement tray 110 moves along the guide shaft 141 in a direction (e.g., X-axis direction) perpendicular to the optical axis (e.g., Z-axis in FIG. 6), the rotation tray 113 may rotate in engagement with the rotation guide 143. Accordingly, the polarization axis 120a of the filter 120 accommodated in the rotation guide 143 may also rotate together. As the moving distance of the movement tray 110 increases, the rotation angle of the rotation tray 113 may also increase. That is, according to the camera module 10, in one or more examples, the polarization axis 120a can be rotated at a desired angle by adjusting the moving distance of the filter 120.

In one or more examples, through holes of the trays 110 and 113 that allow passage of incident light, may be formed to be larger than the light receiving portion of the image sensor 300. That is, the filter 120 accommodated in the through holes of the trays 110 and 113 may be provided to entirely cover the light receiving portion of the image sensor. Accordingly, an angle of the polarization axis 120a may be adjusted in a state where the filter 120 covers the light receiving portion of the image sensor 300 by moving by a predetermined distance in a direction perpendicular to the optical axis (e.g., the Z-axis in FIG. 6). In a state where the filter 120 covers the light receiving portion of the image sensor 300, the angle of the polarization axis 120a may be adjusted in a range of 0 to 180 degrees with respect to a moving direction of the filter 120. Accordingly, the camera module according to some embodiments may selectively allow passage of only light vibrating in a desired direction with respect to incident light passing through the lens module.

In one or more examples, a structure that increases a friction force between the friction portion 113a of the rotation tray 113 and the rotation guide 143 may be further provided. In an example, as illustrated in FIG. 6, the friction portion 113a of the rotation tray 113 may include teeth, and correspondingly, the rotation guide 143 may be provided to engage the teeth of the rotation tray 113. The rotation guide 143 may include a rack gear extending in one direction for firm engagement with the teeth. Accordingly, it is possible to more precisely control an amount of rotation of the rotation tray 113 and the filter 120.

However, the driving of the rotation tray 113 is not limited to the above-described configuration. That is, a driving force to rotate the rotation tray 113 may be generated by a separate rotation driving device. In an example, apart from the driving motor 131 that moves the movement tray 110, another driving device connected to the rotation tray 113 to transmit a rotational driving force may be further provided.

Since the camera module 10 according to one or more examples may appropriately block unnecessary reflected light, particularly incident from an external environment, it is possible to obtain high-quality image data even in a harsh external environment such as rainy weather. That is, in the camera module 10 according to one or more examples, the filter 120 that performs a polarization operation, may be inserted between the lens module 200 and the image sensor 300 to provide clearer image information. Additionally, in an environment where polarization is not needed, the filter 120 may be moved to a position, distant from the image sensor 300 to secure a sufficient amount of light for photographing. In the camera module 10 in accordance with one or more embodiments, the polarization axis 120a may be continuously rotated in a state where the filter 120 is positioned above the image sensor 300. Accordingly, reflected light can be blocked in a more effective manner, and high-quality image data can be obtained in any environment.

As set forth above, the camera module according to one or more embodiments may block unnecessary reflected light, and may obtain high-quality image information by implementing the filter polarizing incident light.

The camera module, in accordance with one or more embodiments, may selectively apply the filter according to various examples by moving the filter to be positioned above the image sensor, or by moving the filter so that it is not positioned above the image sensor.

The camera module, in accordance with one or more embodiments, may protect the filter and the filter actuator from an environment outside the camera module by placing the filter and the filter actuator between the lens module and the image sensor inside the camera module.

The camera module, in accordance with one or more embodiments, may be structurally simple and small by placing the filter actuator inside the housing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a lens module comprising one or more lenses;
an image sensor configured to convert light passing through the lens module into an electrical signal; and
a filter configured to perform a polarization operation, wherein the filter is configured to be movable in a space formed between the lens module and the image sensor,
wherein a lead screw is disposed on one side of the filter to guide linear movement of the filter,
wherein a rotation guide is disposed on an opposite side of the filter to guide rotational movement of the filter, and
wherein the lead screw and the rotation guide are arranged parallel to each other.

2. The camera module of claim 1, further comprising a filter actuator configured to provide a driving force to move the filter,
wherein the filter is configured to be moved linearly in a direction that intersects an optical axis by the filter actuator, to be positioned in a location that is distant from the image sensor.

3. The camera module of claim 2, wherein the filter actuator is configured to rotate a polarization axis of the filter when the filter moves.

4. The camera module of claim 2, wherein the filter actuator comprises:
a tray configured to movably support the filter;
a lead screw rotatably connected to the tray; and
a driving motor configured to rotate the lead screw,
wherein the tray is configured to move in the direction that intersects the optical axis with the lead screw.

5. The camera module of claim 4, wherein a rotation axis of the driving motor is perpendicular to a moving direction of the tray.

6. The camera module of claim 4, wherein the filter actuator further comprises a guide device configured to guide the movement of the tray,
the tray comprises: a first connector disposed on a first side of the tray; and a second connector disposed on a second side of the tray,
the first connector is in contact with the lead screw, and the second connector is slidably connected to the guide device.

7. The camera module of claim 6, wherein the guide device is disposed in parallel with the lead screw.

8. The camera module of claim 6, wherein the second connector has a length that is greater than a length of the first connector.

9. The camera module of claim 4, wherein the tray comprises: a movement tray configured to move in the direction that intersects the optical axis; and
a rotation tray disposed to be rotatable with respect to the movement tray,
wherein the filter is coupled to the rotation tray to rotate with the rotation tray.

10. The camera module of claim 9, wherein the filter actuator further comprises a guide device connected to the tray, and
wherein the guide device comprises:
a guide shaft, connected to the movement tray, and configured to guide the movement of the movement tray, wherein the rotation guide is connected to the rotation tray and rotates the rotation tray the moveable tray moves.

11. The camera module of claim 10, wherein the rotation tray is configured to have a friction portion on an outer circumferential surface thereof in contact with the rotation guide, and
the rotation tray is configured to rotate based on a rolling friction between the friction portion and the rotation guide when the movement tray moves.

12. A camera module, comprising:
a lens module comprising one or more lenses;
an image sensor configured to receive light passing through the lens module; and
a filter configured to polarize the light passing through the lens module,
wherein the filter is configured to be movable between a first position facing the image sensor, and a second position, distant from the image sensor,
wherein a lead screw is disposed on one side of the filter to guide linear movement of the filter,
wherein a rotation guide is disposed on the other side of the filter to guide rotational movement of the filter,
wherein the lead screw and the rotation guide are arranged parallel to each other.

13. The camera module of claim 12, further comprising a housing having an internal space in which the lens module, the image sensor, and the filter are accommodated,
wherein the first position and the second position are formed in the internal space of the housing.

14. The camera module of claim 12, wherein the filter is configured to move linearly between the first position and the second position.

15. The camera module of claim 12, wherein a polarization axis is rotated when the filter moves between the first position and the second position, and
wherein a rotation angle of the polarization axis increases in proportion to a moving distance of the filter.

16. The camera module of claim 15, wherein the movement of the filter and the rotation of the polarization axis are performed by a single driving motor.

17. A camera module, comprising:
a lens module comprising one or more lenses;
an image sensor configured to convert light passing through the lens module into an electrical signal;

a filter configured to perform a polarization operation, wherein the filter is configured to be movable in a space formed between the lens module and the image sensor; and a filter actuator configured to provide a driving force to move the filter, wherein the filter actuator comprises:
a tray configured to movably support the filter;
a lead screw rotatably connected to the tray;
a driving motor configured to rotate the lead screw, wherein the tray is configured to move in the direction that intersects the optical axis with the lead screw,
wherein the tray comprises a movement tray configured to move in the direction that intersects the optical axis, and a rotation tray disposed to be rotatable with respect to the movement tray, wherein the filter is coupled to the rotation tray to rotate with the rotation tray; and
a guide device connected to the tray, wherein the guide device comprises a guide shaft, connected to the movement tray, and configured to guide the movement of the movement tray, and a rotation guide, connected to the rotation tray, and configured to rotate the rotation tray when the movement tray moves.

* * * * *